United States Patent [19]

Baker

[11] 3,860,962

[45] Jan. 14, 1975

[54] MAGNETIC TAPE REPRODUCING APPARATUS

[75] Inventor: Julian Baker, Llantrisant, Glamorgan, Wales

[73] Assignees: Rosemarie Ann Baker; Barrie William Cooper; Doreen Christine Cooper; Richard L. Aubrey, ; part interest to each

[22] Filed: Mar. 28, 1972

[21] Appl. No.: 238,809

[30] Foreign Application Priority Data

Apr. 1, 1971 Great Britain .................... 08477/71

[52] U.S. Cl. .................................................. 360/92

[51] Int. Cl. ......................... G11b 21/08, G11b 5/00

[58] Field of Search .............. 194/15, 6; 179/6.3 R, 179/6.3 MA, 100.2 MD, 100.2 Z; 274/4 R, 4 F, 4 A, 10 A, 10 D; 340/162; 360/92

[56] References Cited

UNITED STATES PATENTS

| | | | |
|---|---|---|---|
| 2,481,398 | 9/1949 | Danisch | 274/4 A |
| 2,507,385 | 5/1950 | Shrader | 274/4 F |
| 2,628.280 | 2/1953 | Wilson et al. | 274/10 A |
| 3,154,308 | 10/1964 | Faulkner | 274/4 A |
| 3,237,951 | 3/1966 | Kimberlin et al. | 274/11 D |
| 3,511,351 | 5/1970 | Jones | 194/15 |
| 3,632,114 | 1/1972 | Ban | 274/4 A |

*Primary Examiner*—Harry N. Haroian
*Attorney, Agent, or Firm*—Burns, Doane, Swecker & Mathis

[57] ABSTRACT

Apparatus for reproducing a recording selected from a plurality of recordings on magnetic tape includes a plurality of tape decks each for reproducing a respective magnetic tape in the form of an endless loop bearing a plurality of recordings on separate tracks, selector means by which a user can indicate a recording selected for reproduction, means responsive to the selector means to select for operation the tape deck having the magnetic tape bearing the selected recording, and means responsive to the selector means to select for reproduction the selected recording on the magnetic tape of the tape deck selected for operation. A search unit is operatively connected to the selector unit and is adapted to perform a scanning operation to determine the next selected recording to be reproduced. The search unit controls a deck selecting unit operatively connected with a motor of each tape deck and a track selecting unit operatively connected to a reproducing head of each tape deck. The two selecting units respond to the search unit to select for operation the motor of the tape deck which has the magnetic tape bearing the selected recording to be reproduced and to set the reproducing head of the tape deck selected for operation so as to achieve reproduction of the track corresponding to the selected recording. An indicating unit monitors the operation of the deck and track selecting units and is operatively connected to amplifier means to energize such amplifier means to amplify the output of the reproducing heads when the required track has been selected.

24 Claims, 5 Drawing Figures

MAGNETIC TAPE REPRODUCING APPARATUS

This invention relates to apparatus for reproducing a recording selected from a plurality of recordings on magnetic tape. The invention finds particular application in an amusement machine employing musical recordings.

According to the invention in its broadest aspect, apparatus for reproducing a recording selected from a plurality of recordings on magnetic tape includes a plurality of tape decks each for reproducing a respective magnetic tape bearing a recording, selector means by which a user can indicate a recording selected for reproduction, and means responsive to the selector means to select for operation the tape deck having the magnetic tape bearing the selected recording.

In accordance with another aspect of the invention, apparatus for reproducing a recording selected from a plurality of recordings on magnetic tape includes a plurality of tape decks each for reproducing a respective magnetic tape in the form of an endless loop bearing a plurality of recordings on separate tracks, selector means by which a user can indicate a recording selected for reproduction, means responsive to the selector means to select for operation the tape deck having the magnetic tape bearing the selected recording, and means responsive to the selector means to select for reproduction the selected recording on the magnetic tape of the tape deck selected for operation.

A preferred embodiment of the invention includes a search unit operatively connected to the selector unit and adapted to perform a scanning operation to determine the next selected recording to be reproduced.

A deck selecting unit is provided having an operative connection with a motor of each tape deck, such deck selecting unit being responsive to the search unit and acting to select for operation the motor of the tape deck which has the magnetic tape bearing the selected recording to be reproduced.

A track selecting unit is also provided having an operative connection with a reproducing head of each tape deck, such track selecting unit being responsive to the search unit and acting to set the reproducing head of the tape deck selected for operation so as to achieve reproduction of the track corresponding to the selected recording.

Preferably, the apparatus includes an indicating unit arranged to monitor the operation of the deck selecting unit and the track selecting unit, and operative to indicate when the tape deck and track corresponding to the selected recording have been selected. Suitably, the indicating unit is operatively connected to amplifier means for amplifying the output of the reproducing heads, the indicating unit operating to energize the amplifier means when the required track has been selected.

Conveniently, the apparatus includes a control unit operatively connected to the indicating unit and to the track selecting unit, such control unit being adapted to set the track selecting unit in operation when the indicating unit indicates that the tape deck corresponding to the selected recording has been selected. The control unit may be operatively connected to the deck selecting unit to cause the deck selecting unit to energize the motor of the selected tape deck when the track corresponding to the selected recording has been selected. The control unit may be operatively connected to the search unit to cause the search unit to operate briefly after a selected recording has been reproduced and to thereby cancel the registration of such recording in the selector unit.

According to another preferred feature, the apparatus includes a memory unit operatively connected to the indicating unit and to the control unit, such memory unit being actuated by the control unit after selection of the track corresponding to the selected recording to register that the deck and track corresponding to the selected recording have been selected thereby to ensure that the apparatus subsequently continues to reproduce the recording in the event of a power failure.

The apparatus may further include a stop unit actuated by a stop foil provided on each tape to denote the end of the recordings thereon, such stop unit actuating the memory unit at the end of the reproduction of the selected recording to set the control unit in motion to effect cancellation of the registration of the reproduced recording in the selector unit.

The subject matter which I regard as my invention is particularly pointed out and distinctly claimed in the concluding portion of this specification. The invention, however, both as to organisation and method of operation, may best be understood by reference to the following description taken in conjunction with the appended drawing wherein like reference characters refer to like elements.

Figure 1:
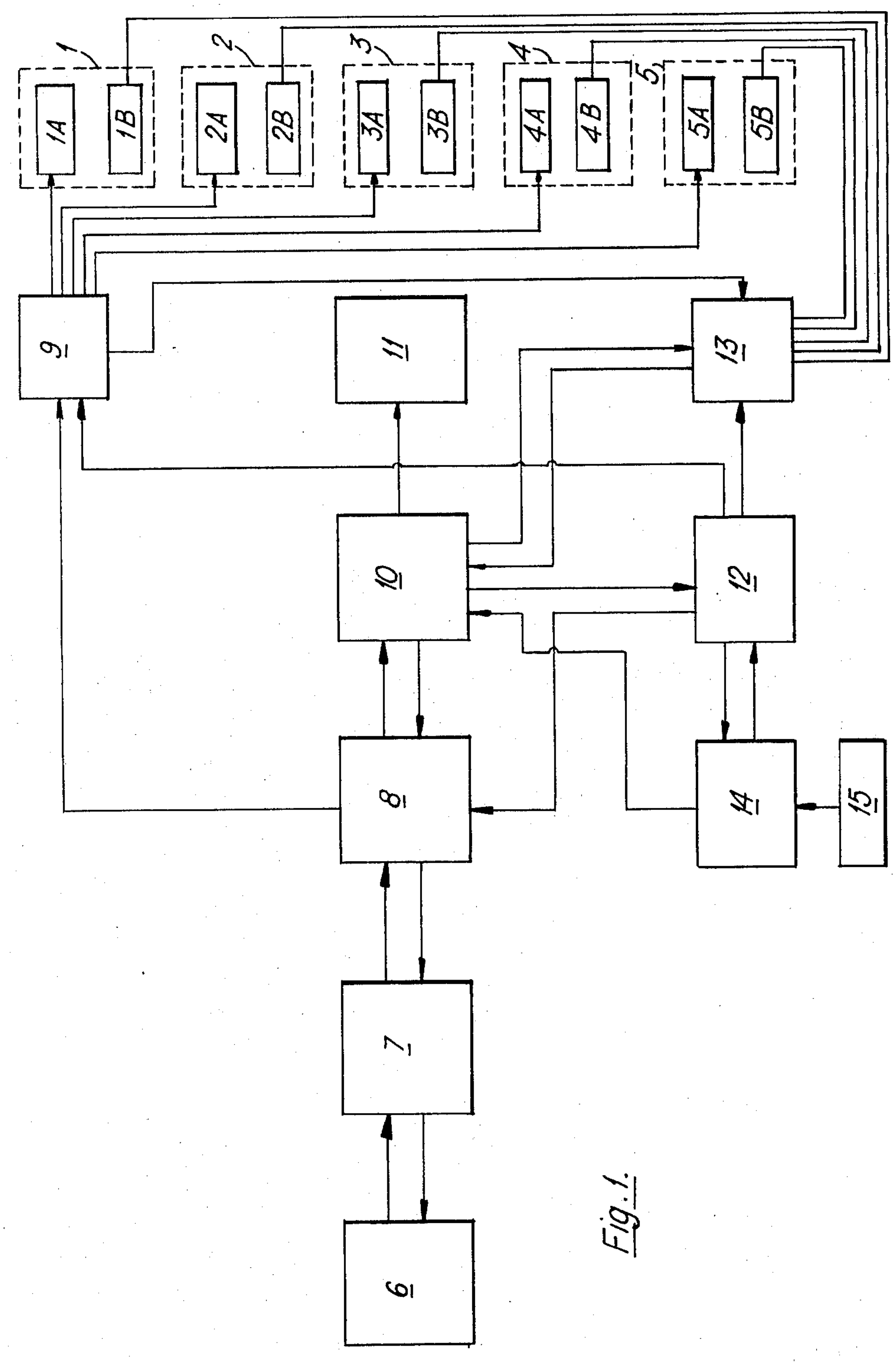
FIG. 1 is a block diagram schematically illustrating a coin-operated amusement machine embodying the invention for producing a recording selected from a number of musical recordings stored on magnetic tape.

Referring firstly to FIG. 1, a coin operated amusement machine includes five selectively operable tape decks 1 to 5, each for reproducing stereo musical recordings on a magnetic tape of a respective stereo tape cartridge. Each tape cartridge includes a magnetic tape in the form of an endless loop having a stop foil denoting the end of the recordings on the loop. Each magnetic tape loop has eight tracks two of which are required to constitute a stereo track for each recording, so that each loop bears four stereo recordings and a total of twenty recordings are provided by the five tape cartridges. Each tape deck 1 to 5 has a deck motor 1A to 5A and a reproducing head 1B to 5B capable of reproducing any selected one of the four stereo recordings on the respective magnetic tape loop.

A coin-operated credit unit 6 of the machine is adapted to receive coins establishing credit to enable a user to select, by means of a selector unit 7, either one or two recordings for reproduction. The selector unit 7 is operatively connected to a search unit 8 which performs a scanning operation to determine the next selected recording to be reproduced and which delivers outputs to a deck selecting unit 9 having an operative connection with each of the deck motors 1A to 5A and to an indicating unit 10 connected to control the operation of amplifiers 11. The indicating unit 10 also delivers outputs to a control unit 12 and to a track selecting unit 13 connected to receive an input from the deck selecting unit 9 and having an operative connection with each of the reproducing heads 1B to 5B. The indicating unit 10 receives inputs from the track selecting unit 13 and from a memory device 14. The control unit 12 controls the operation of the deck selecting unit 9, the track selecting unit 13 and the memory unit 14, and is also operatively connected to the search unit 8. A stop unit 15 actuated by the stop foil of a tape loop is operatively connected to the memory device 14.

The operation of the machine schematically represented in FIG. 1 is as follows. On insertion of a coin or coins by a user in the coin operated unit 6, credit is established and the unit 6 enables the selector 7, so that the user can then select from the twenty available recordings that recording or recordings to be reproduced. On selection of the desired recording or recordings by the user, the selecter unit 7 operates to register the selected recording(s) and to reset the credit unit 6 to prevent further selection until further coins have been inserted in the credit unit. The selector 7 sets in motion the search unit 8 which performs an orderly scanning operation to determine which is the next selected recording to be reproduced. This information is transmitted to the deck selecting unit 9 which determines which tape deck 1 to 5 has the tape bearing the selected recording. However, the motor of the appropriate tape deck is not yet energized.

The operation of the search unit 8 is monitored by the indicator 10 which stops the search unit when the selected recording is reached in the course of the scanning operation and registers that the appropriate deck has been determined. The indicator 10 then enables the control unit 12 which sets in motion the track selector unit 13. The unit 13 also receives information from the deck selecting unit 9 and operates to locate the stereo track of the tape on the deck selected by the unit 9 which is to be reproduced. The reproducing head of the selected deck is then energized so as to reproduce the selected stereo track. The operation of the track selecting unit 13 is monitored by the indicator unit 10 which operates to stop the unit 13 when the required track is located and also energizes the amplifiers 11 for amplifying the recording to be reproduced. Achievement of the selection of the deck and stereo track corresponding to the selected recording is registered in the memory unit 14 to ensure that reproduction of the recording will continue subsequently should operation of the machine be temporarily interrupted by a failure of the power supply. The control unit 12 then enables the selecting unit 9 and such unit energizes the selected deck motor 1A to 5A which then operates, the corresponding reproducing head 1B to 5B reproducing the selected stereo track of the tape on the deck 1 to 5 which is in operation. The control unit ceases operation.

At the end of the reproduction of the recording, the stop unit 15 is actuated by the stop foil on the tape to cancel the information stored in the memory 14 and to set in motion the control unit 12. On restarting, the control unit initiates a further short scanning movement of the search unit and de-energizes the deck motor which has been in operation. If no further recording has been selected and registered in the selector unit 7, the search unit acts to cancel the previously reproduced selection in the selector unit and renders the indicator unit inoperative thereby stopping the control unit. The return of the indicator unit to its inoperative condition de-energizes the amplifiers and the track selecting unit thereby switching off the reproducing head which has been in operation. If a further selection is present in the selector unit 7, the cancellation of the selection just reproduced is effected, but the search unit 8 continues its scanning operation until it locates the further selection to be reproduced, the sequence of events which takes place thereafter being the same as described with reference to the reproduction of the first selection.

Figure 2:
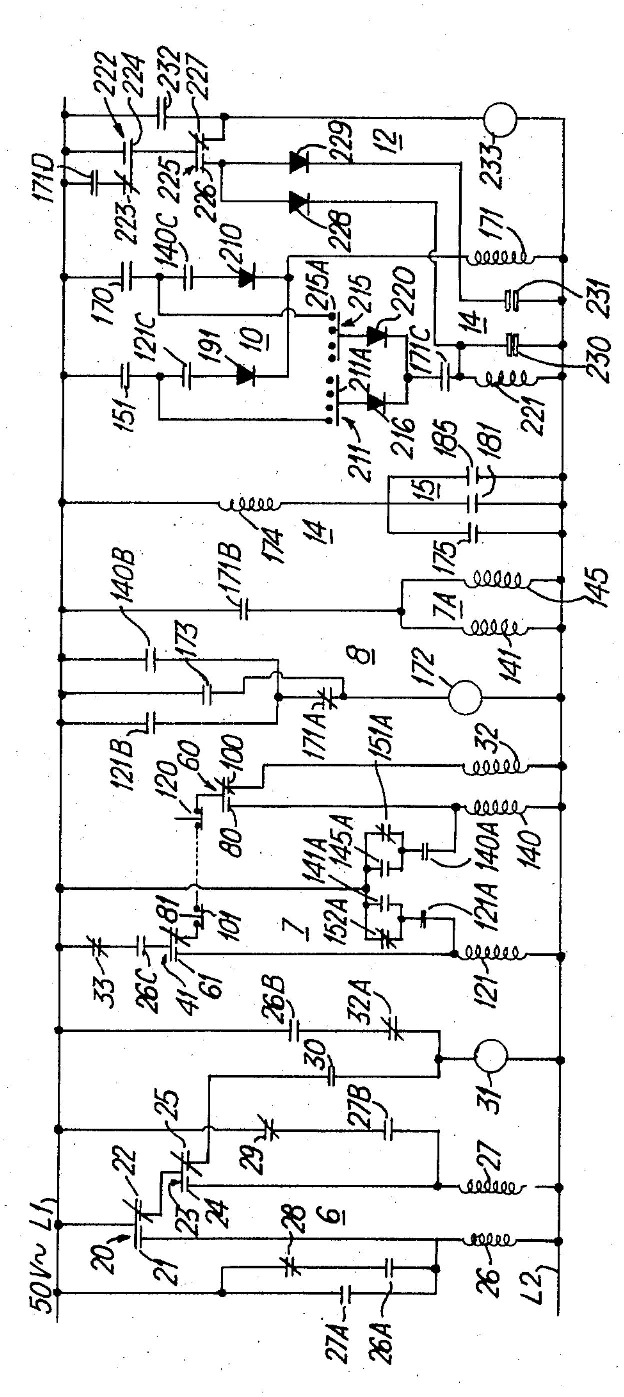
FIG. 2 illustrates a first part of the electrical circuitry of the amusement machine of FIG. 1.

Referring now to FIG. 2, a first part of the electrical circuitry of the machine of FIG. 1 is fed from a 50 volts AC supply via supply lines L1 and L2. The credit unit 6 includes a first coin-operated microswitch 20 connected to line L1 and having normally open contacts 21 and normally closed contacts 22. A second coin-operated microswitch 23 has normally closed contacts 25 and normally open contacts 24 connected to contacts 22 of microswitch 20. A first credit relay 26 is connected to line L2 and is connectible to line L1 via the normally open contacts 21 of microswitch 20. A second credit relay 27 is connected to line L2 and is connectible to line L1 via contacts 24 of microswitch 23 and contacts 22 of microswitch 20. The relay 26 is also connectible to line L1 via two parallel paths, one of which includes in series a normally open relay switch 26A of relay 26 and a normally closed cam switch 28 and the other of which includes a normally open relay switch 27A of relay 27. The relay 27 is also connectible to the line L1 via a path including a normally open relay switch 27B of relay 27 and a normally closed cam switch 29. A normally open cam switch 30 connects contacts 25 of microswitch 23 to a credit unit motor 31 which is also connected to the line L2. The motor 31 is connectible to the line L1 via a path including a normally closed relay switch 32A of a control relay 32 in the selector unit 7 and a normally open relay switch 26B of relay 26.

The selector unit 7 includes a normally closed cam switch 33 and a normally open relay switch 26C of relay 26 connected in series to the line L1. A set of twenty microswitches 41 to 60 are connected in cascade to the relay switch 26C. Each microswitch 41 to 60 has normally open contacts 61 to 80 and normally closed contacts 81 to 100. The microswitches 41 to 60 are connected in cascade via their normally closed contacts 81 to 100 and the normally closed contacts 100 of microswitch 60 is connected to line L2 via control relay 32. A set of twenty selector push buttons 101 to 120 are provided and each such push button is associated with a respective microswitch 41 to 60. The normally open contacts 61 to 80 of the microswitches 41 to 60 are each associated with a respective selector relay 121 to 140, each such selector relay being connected between the associated contacts of the respective microswitch and the line L2. Each selector relay 121 to 140 is connectible to the line L1 via a path including a normally open relay switch of the same relay and a pair of parallel branches. A first branch includes a normally open relay switch 141A to 145A of a respective one of five dropoff relays 141 to 145 to be described hereinafter and a second branch includes normally closed scan contacts 151A to 170A one of twenty scan switches 151 to 170 to be described hereinafter. Each scan switch 151 to 170 corresponds to a respective selector relay 121 to 140 and the scan contacts 152A to 151A are so arranged that the scan contacts in the second branch of the parallel arrangement of a selector relay B are those of the scan switch corresponding to the next selector relay in sequence.

The search unit 8 includes a search motor 172 connected to line L2 and energizable via a normally closed relay switch 171A of a deck selected relay 171 of indicating unit 10 and any one of twenty parallel paths connected to line L2 each including a respective normally open relay switch 121B to 140B of a relay 121 to 140. The motor 172 is alternatively energizable via a path including a normally open cam switch 173 of the control unit 12.

A set of five drop off relays 141 to 145 are provided as hereinbefore mentioned and constitute a part 7A of selector unit 7, such relays being connected in parallel with each relay connected to the line L2 and connectible to the line L1 through a normally open relay switch 171B of deck selected relay 171.

The memory unit 14 includes a memory solenoid 174 connected to line L1 and connectible to line L2 either via a path including a normally open cam switch 175 of the control unit 12 or via any one of five parallel paths each including a respective normally open stop switch 181 to 185 of the stop unit 15.

The indicator unit 10 includes deck selected relay 171 which is connected to line L2 and is connectible to line L1 via any one of twenty paths, each such path including normally open contacts of a respective scan switch 151 to 170, a normally open relay switch 121C to 140C of a respective selector relay 121 to 140 and a diode 191 to 210. The search motor 172 when energised drives a scanning contact which closes the scan switches 151 to 170 in succession. The unit 10 further includes five sets of track indicating terminals 211 to 215, each such set including five terminals each of which is connected to the line L1 via a respective one of a group of five scan switches. A stepping contact 211A to 215A of each track indicating terminal set is connectible to each of the terminals of the set in succession and is connected via a respective diode 216 to 220 through a normally open relay switch 171C of relay 171 to a track selected relay 221 which is connected to line L2.

The control unit 12 includes a normally open relay switch 171D of relay 171 connected to line L1. This relay switch 171D is connected to normally closed contacts 223 of a cam switch 222 having normally open contacts 224 connected to the line L1. A microswitch 225 which is controlled by memory relay 174 is connected to contacts 224 of cam switch 222 and has normally open contacts 226 and normally closed contacts 227. The normally open contacts 226 are connected to the line L2 via parallel paths incorporating respective diodes 228 and 229 and respective smoothing capacitors 230 and 231. The junction of the diode 228 with the capacitor 230 is connected to the junction between the relay switch 171C and the track selected relay 221. The junction between the diode 229 and the capacitor 231 is connected to that end of the deck selected relay 171 which is not connected to the line L2. The contacts 227 of the microswitch 225 are connected to a control unit motor 233 which is connected to line L2 and which is also connectible to the line L1 via a normally open cam switch 232.

Figure 3:
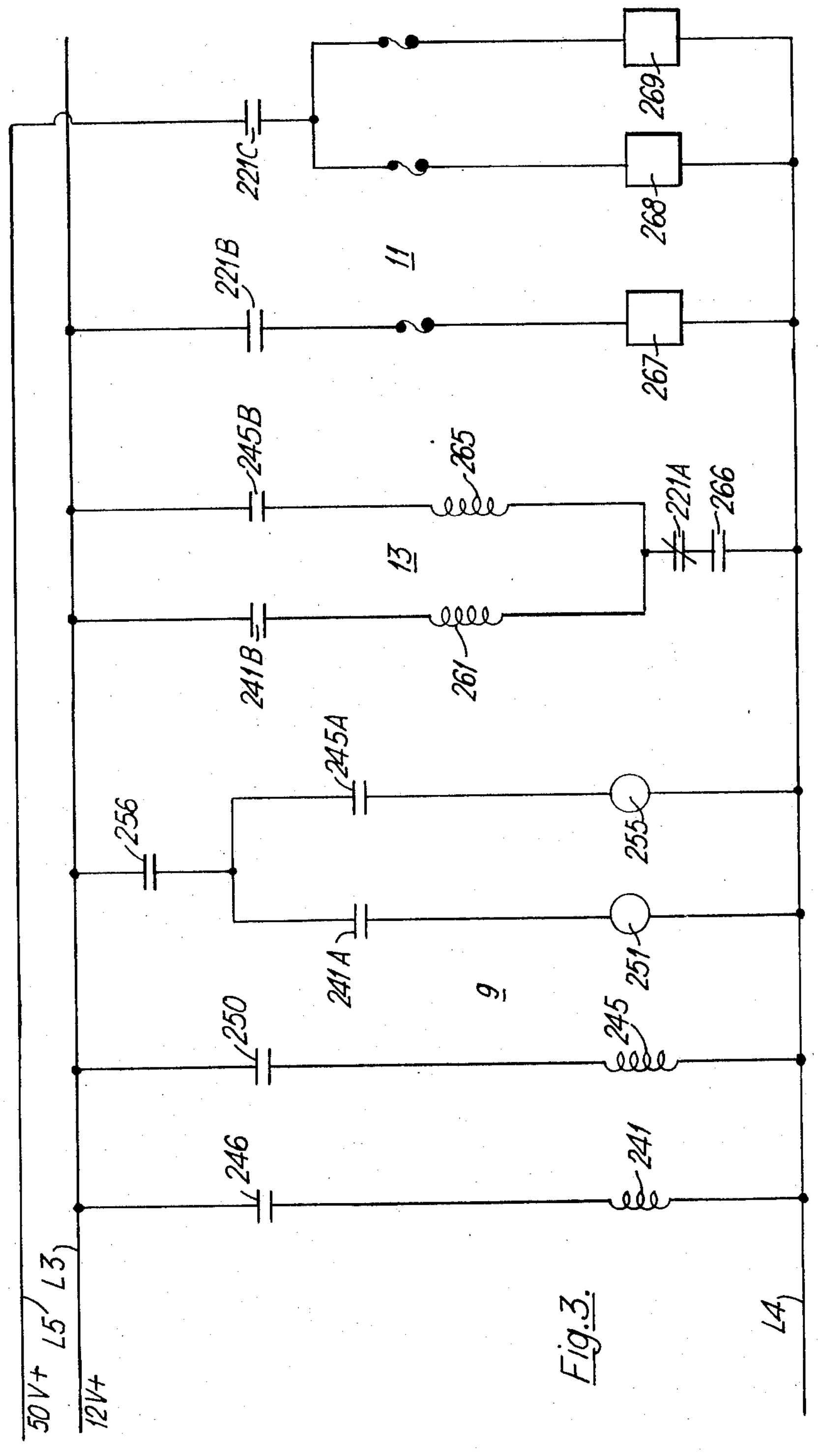
FIG. 3 illustrates a second part of the electrical circuitry of the machine of FIG. 1.

FIG. 3 shows a second part of the electrical circuitry of the machine provided with a 12 volt DC supply between supply lines L3 and L4 and a 50 volt DC supply between supply lines L5 and L4.

The deck selecting unit 9 includes five deck relays 241 to 245 each connected in a path between the lines L3 and L4 in series with a respective one of five normally open scan contacts 246 to 250 each of which is closed when any one of an associated group of five of the scan switches 151 to 170 is closed. The unit 9 controls the energization of five deck motors 251 to 255 (corresponding to motors 1A to 5A in FIG. 1) connected in parallel paths each including a normally open relay switch 241A to 245A of a respective deck relay 241 to 245. Each parallel path is connected to the line L4 and is connectible to the line L3 via a cam switch 256 controlled by motor 233.

The track selector unit 13 includes 5 stepper solenoids 261 to 265 each for effecting stepping of a respective reproducing head and the corresponding sequential scanning of a respective track indicating terminal set 211 to 215 associated with a corresponding deck. Each such stepper solenoid is connected in series with a normally open relay switch 241B to 245B of a respective deck relay 241 to 245. The paths incorporating the stepper solenoids are connected in parallel to the line L3 and are each connectible to the line L4 via a normally closed relay switch 221A of track selected relay 221 and a normally open cam switch 266 which is under the control of the control unit motor 233. A preamplifier 267 is connected in series with a normally open relay switch 221B of the relay 221 in a path extending between the lines L3 and L4. Two main amplifiers 268 and 269 are connected in series with a normally open relay switch 221C of relay 221 between the lines L5 and L4.

During its rotation, the control unit motor 233 operates the cam switches 173, 175, 222, 232, 256 and 266.

Figure 4:
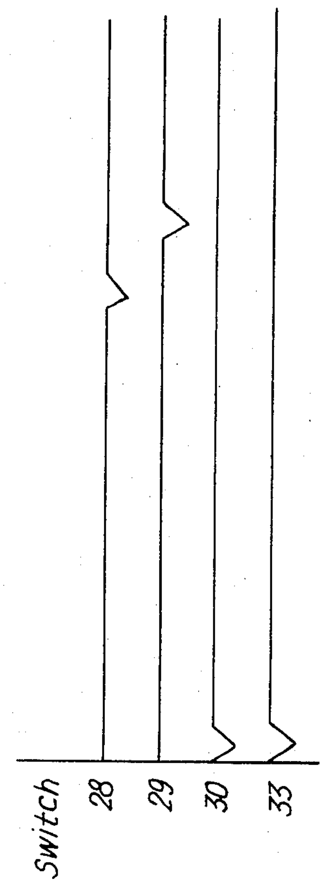
FIG. 4 is a timing diagram related to the rotational position of a motor in a coin-operated credit unit of the machine showing the sequence of operation of four cam switches actuated by the motor.

The operation of the circuitry described with reference to FIGS. 2, 3 and 4 will now be described, considering firstly the case of a user inserting a coin enabling him to select a single recording for reproduction.

Insertion of the coin in the coin-operated credit unit 6 momentarily closes the contacts 21 of the microswitch 20 thereby energizing the first credit relay 26 which held energised via its alternative supply path including the relay switch 26A and the cam switch 28.

The relay switch 26C of the relay 26 closes in the selector unit 7 thereby energizing the control relay 32 through the contacts 81 to 100 of microswitches 41 to 60. The relay switch 32A is thus opened while the relay switch 26B of relay 26 has closed, so that the credit unit motor 31 remains inoperative. Operation of the desired push button 101 to 120 in order to select and register a corresponding recording for reproduction closes the normally open contacts 61 to 80 of the respective microswitch 41 to 60 thereby energising the corresponding selector relay 121 to 140, such relay being held energized via its alternative supply path including its own contactor 121A to 140A and the respective contacts 152A to 151A. At the same time the control relay 32 is de-energized enabling the energisation of motor 31 through the now closed relay switches 26B and 32A. Rotation of the motor 31 from its initial position results firstly in closure of cam switch 30 and opening of cam switch 33 thereby providing an energization path for motor 31 through contacts 22 and 25 and switch 30 and interrupting the supply to microswitches 41 to 60. Continued rotation of the motor 31 opens cam switch 28 with the consequent de-energization of the relay 26 and opening of relay switches 26B and 26C. The motor 31 is subsequently brought to rest in its initial position by opening of cam switch 30 and in this position cam switch 33 is re-closed. In the selector unit the selected relay 121 to 140 is held energized via its alternative supply path.

The energized selector relay 121 to 140 energizes the search unit motor 172 via its now closed relay switch 121B to 140B and the normally closed deck selected relay switch 171A. The search motor 172 then scans via its scanning contact the scan switches 151 to 170, closing these switches in succession. When the scan switch corresponds to the now closed relay switch 121C to 140C of the energized selector relay 121 to 140 is closed, the deck selected relay 171 is energised, with the result that the search unit motor 172 is de-energized by the opening of relay switch 171A, the control unit motor 233 is energized and the energizing circuit for the drop off relays 141 to 145 is closed through relay switch 171B. In the selector unit 7 the drop off relay switches 141A to 145A are closed thereby establishing a further alternative path for the energization of the selector relay 121 to 140 originally energized.

The closure of the scan switch 151 to 170 also results in the closure of respective scan contacts 246 to 250 which energizes a corresponding deck relay 241 to 245 in the deck selecting unit. The relay switch 241A to 245A of the energized deck relay closes, but the corresponding deck motor 251 to 255 is not yet energized because the cam switch 256 is open at this time.

Figure 5:
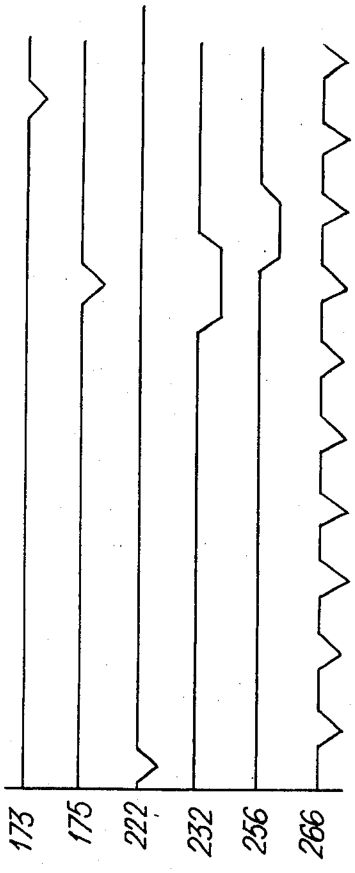
FIG. 5 is a timing diagram related to the rotational position of a motor in a control unit of the machine showing the sequence of operation of six cam switches actuated by the motor.

The relay switch 241B to 245B corresponding to the energized deck relay closes in the circuit of the respective stepper solenoid 261 to 265 which is energized in a pulsed fashion as a result of the repeated closing and opening of the cam switch 266 by the control motor 233 (see FIG. 5). The pulsed energization of the energized stepper solenoid 261 to 265 causes stepping of the respective reproducing head and causes the stepping contact of the respective terminal set 211 to 215 to be connected in succession to the four contacts of the set. When the stepping contact becomes connected to the terminal connected to the closed scan switch 151 to 170, the track selected relay 221 is energized via the diode 216 to 220 and the now closed deck selected relay switch 171C. The track selected relay 221 closes its relay switches 221B and 221C in the amplifier energization circuits and opens its relay switch 221A in the stepper solenoid energization circuit to prevent further stepping of the reproducing head and the stepping contact of the terminal set. The reproducing head of the selected tape deck is now set to reproduce the required stereo track of the tape.

The control unit motor 233 is energized in its initial position through the closed relay switch 171D, the normally closed contacts 223 of the cam switch 222 and the normally closed contacts 227 of the microswitch 225. Once the motor rotates from its initial position, however, the switch 222 is operated to open contacts 223 and close contacts 224, so the motor is then energized via closed contacts 224 of microswitch 222 and closed contacts 227 of microswitch 225 during the period when it pulses the cam switch 226 (see FIG. 5). After the track has been selected, the cam switch 232 is closed to provide an alternative supply path for the motor 233. Subsequently, the cam switch 175 closes to energize the memory solenoid 174 which closes the contacts 226 of the microswitch 225 and opens the contacts 227. The closure of contacts 226 provides an alternative path for the two relays 221 and 171 through the respective diodes 228 and 229, so that in the event of an interruption of the power supply the relays 221 and 171 will re-energise to ensure that the machine will continue to reproduce the selected recording when power is restored.

While the cam switch 232 is still closed, the cam switch 256 closes to energize the selected deck motor, and when the switch 232 opens to de-energize the control motor 233, the motor remains in a position in which it closes the switch 256. The selected motor operates and the appropriate stereo track of the magnetic tape loop of the deck in operation is reproduced by the reproducing head and fed to the amplifiers.

When the selected recording has been reproduced, the stop foil of the tape loop acutates the respective stop switch 181 to 185 thereby energizing the memory solenoid 174 which re-opens the contacts 226 of the microswitch 225 and closes the contacts 227. The control unit motor is now fed through contacts 224 of cam switch 222 and the now closed contacts 227 of microswitch 225. The motor 233 rotates, first re-opening cam switch 256 to de-energize the deck motor which has been in operation and then closing cam switch 173 to energize the search motor 172 briefly so as to move its scanning contact to the next scan switch 151 to 170. This results in the opening of the scan contacts 152A to 151A in the alternative energizing path of the selector relay corresponding to the recording just reproduced. The energization circuit of the deck selected relay 171 is also broken, so that relay switch 171A is closed and relay switches 171B, 171C and 171D open. Opening of relay switch 171B results in de-energization of the drop off relays with consequent opening of the relay switches 141A to 145A and de-energization of the selector relay corresponding to the recording just reproduced. Opening of relay switch 171C causes de-energization of track selected relay 221 resulting in closing of relay switch 221A, and opening of relay switches 221B and 221C to disconnect the amplifiers 267-269. Finally, opening of contacts 224 of cam switch 222 de-energizes the control unit motor 233 and brings it to rest in its initial position.

The case of a user inserting a coin entitling him to select two recordings for reproduction will now be considered.

Insertion of the coin into the credit unit 6 momentarily closes contacts 24 of microswitch 23. Closure of contacts 24 causes energization of the second credit relay 27 which is held energized via its alternative supply path including relay switch 27B and cam switch 29. Relay switch 27A closes to energize relay 26 with consequent closure of relay switches 26A, 26B and 26C.

Closure of the relay switch 26C in the selector unit 7 energises the control relay 32. The relay switch 32A is thus opened while the relay switch 26B of relay 26 has closed, so that the credit unit motor 31 remains inoperative as yet. Operation of the desired push button 101 to 120 in order to select and register a recording for reproduction closes the normally open contacts 61 to 80 of the microswtiches 41 to 60 thereby energizing the selector relay 121 to 140, the relay being held energized via its alternative supply path. At the same time, the control relay 32 is de-energized enabling the energization of motor 31 through thenow closed relay switches 26B and 32A. Rotation of motor 31 from its initial position causes cam switch 30 to close and cam switch 33 to open so as to provide an energization path for motor 31 through contacts 22 and 25 and switch 30 and interrupting the supply to microswitches 41 to 60. Continued rotation of the motor 31 firstly opens cam switch 28 briefly, but relay 26 remains energized through its supply path including relay switch 27A. Cam switch 28 recloses and subsequently cam switch 29 is opened to de-energize relay 27 resulting in the opening of relay switch 27A. However relay 27 remains energized via its supply path including relay switch 26A and cam switch 28. The motor 31 is brought to rest in its initial position by opening of cam switch 30 when such position is reached, cam switch 33 then being reclosed to allow a further selection to be made as the relay 26 is still energized. Operation of the desired push button 101 to 120 in order to select and register a further selection closes the normally open contacts 61 to 80 of the respective microswitch 41 to 60 thereby energizing the respective selector relay 121 to 140, the relay being held energized via its alternative supply path. At the same time, the control relay 32 is de-energized enabling energization of motor 31 through the now closed relay switches 26B and 32A. Rotation of the motor 31 closes cam switch 30, then opens cam switch 28 to de-energize relay 26. Finally, the motor is stopped in its initial position by opening of cam switch 30.

The search motor 172 is then energized through the closed relay switches 121B to 140B of the energized selector relays and a first selected recording is located and reproduced as hereinbefore described.

When the first selected recording has been reproduced, the stop foil on the tape loop actuates the respective stop switch 181 to 185 causing operation of the control unit motor to de-energize the deck motor which has been in operation and to energize the search motor 172 briefly thereby breaking the circuit through deck selected relay 171 and de-energizing the selector relay corresponding to the recording just reproduced. The track selected relay 221 is also de-energized, the amplifiers disconnected and the control unit motor stopped. However, the selectro relay corresponding to the second selected recording remains energized and consequently the search unit motor 172 continues its movement to effect reproduction of the second selected recording. After reproduction of the second selected recording and if no further recordings have meanwhile been registered in the selector unit 7, operation of the machine ceases.

I claim:

1. Apparatus for reproducing a recording selected from a plurality of recordings on magnetic tape, including a plurality of tape decks each for reproducing a respective magnetic tape bearing a plurality of recordings on separate tracks, a selector unit by which a user can register a recording selected for reproduction, a search unit operatively connected to the selector unit for performing a scanning operation and providing an indication of the location of a recording selected for reproduction and registered in the selector unit, a deck selecting unit having an operative connection with a motor of each tape deck, such deck selecting unit being responsive to the indication provided by the search unit and acting to select for operation the motor of the tape deck which has the magnetic tape bearing the recording to be reproduced, and a track selecting unit having an operative connection with a reproducing head of each tape deck, such track selecting unit being responsive to the indication provided by the search unit and acting to set the reproducing head of the tape deck selected for operation so as to achieve reproduction of the track corresponding to the selected recording.

2. Apparatus according to claim 1, including an indicating unit arranged to monitor the operation of the deck selecting unit and the track selecting unit, and operative to indicate when the tape deck and track corresponding to the selected recording have been selected.

3. Apparatus according to claim 2, wherein the indicating unit is operatively connected to amplifier means for amplifying the output of the reproducing heads, the indicating unit operating to energize the amplifier means when the required track has been selected.

4. Apparatus according to claim 2, including a control unit operatively connected to the indicating unit and to the track selecting unit, such control unit being adapted to set the track selecting unit in operation when the indicating unit indicates that the tape deck corresponding to the selected recording has been selected.

5. Apparatus according to claim 4, wherein the control unit is operatively connected to the deck selecting unit to cause the deck selecting unit to energize the motor of the selected tape deck when the track corresponding to the selected recording has been selected.

6. Apparatus according to claim 4, wherein the control unit is operatively connected to the search unit to cause the search unit to operate briefly after a selected recording has been reproduced and to thereby cancel the registration of such recording in the selector unit.

7. Apparatus according to claim 4, including a memory unit operatively connected to the indicating unit and to the control unit, such memory unit being actuated by the control unit after selection of the track corresponding to the selected recording to register that the deck and track corresponding to the selected recording have been selected thereby to ensure that the apparatus subsequently continues to reproduce the recording in the event of a power failure.

8. Apparatus according to claim 7, including a stop unit actuated by a stop foil provided on each tape to denote the end of the recordings thereon, such stop unit actuating the memory unit at the end of the reproduction of the selected recording to set the control unit in motion to effect cancellation of the registration of the reproduced recording in the selector unit.

9. Apparatus for reproducing a recording selected from a plurality of recordings on magnetic tape including a plurality of tape decks each for reproducing a respective magnetic tape in the form of an endless loop bearing a plurality of recordings on separate tracks, a selector unit by which a user can register a recording selector relays each the selector unit including a plurality of splector relays each of which corresponds to a respective one of the recordings on the magnetic tapes, selection of a particular recording being registered in the selector unit by energization of the corresponding selector relay, means responsive to the selector unit to select for operation the tape deck having the magnetic tape bearing the selected recording, and means responsive to the selector unit to select for reproduction the selected recording on the magnetic tape of the tape deck selected for operation.

10. Apparatus according to claim 9, including a search unit having a search motor adapted to drive a scanning contact for closing in succession each of a plurality of scan switches, each such scan switch corresponding to a respective recording.

11. Apparatus according to claim 10, wherein each selector relay controls a normally open relay switch in a respective energization path for the search motor, whereby on energization of a selector relay the corresponding relay switch is closed.

12. Apparatus according to claim 11, including a deck selecting unit having a deck relay corresponding to each tape deck and controlling a normally open relay switch in an energization path of a motor of the corresponding tape deck, each deck relay being arranged for energization to close the corresponding relay switch in the event that the search unit determines that the selected recording to be reproduced is a recording on the tape of the corresponding tape deck.

13. Apparatua according to claim 12, including a track selecting unit having a stepper solenoid corresponding to each tape deck and controlling stepping of a reproducing head of the corresponding tape deck, each such stepper solenoid being arranged to stepping the reproducing head to set it successively for reproduction of each track on the tape of the corresponding tape deck in the event that the search unit determines that the selected recording to be reproduced is a recording on the tape of the corresponding tape deck.

14. Apparatus according to claim 13, including an indicating unit having a deck selected relay arranged to be energized on selection of the tape deck corresponding to the recording to be reproduced and a track selected relay arranged to be energized on selection 53 of the track of the tape of theselected tape deck.

15. Apparatus according to claim 14, wherein the deck selected relay has a plurality of parallel energization paths each including a respective scan switch of the search unit and a corresponding normally open relay switch of a corresponding selector relay.

16. Apparatus according to claim 14, wherein the track selected relay controls a normally closed relay switch for opening an energization path of the stepper solenoids of the track selecting unit when the reproducing head is set to reproduce the track of the selected tape which corresponds to the selected recording to be reproduced.

17. Apparatus according to claim 14, wherein the track selected relay controls a normally open relay switch in an energization path of amplifier means for amplifying the output of the reproducing heads, whereby on energization of the track selected relay the amplifier means is energized.

18. Apparatus according to claim 14, including a control unit having a motor provided with an energization path including a normally open relay switch controlled by the deck selected relay, such motor being adapted on rotation thereof to close in a pulsed fashion a cam switch included in the or an energization path of the stepper solenoids of the track selecting unit, whereby on energization of the track selected relay the stepper solenoid of the selected tape deck is energized in pulses.

19. Apparatus according to claim 18, wherein the motor of the control unit controls a normally open cam switch provided in a common energization path of the deck motors to energize the motor selected by the deck selecting unit when the track corresponding to the selected recording has been selected by the track selecting unit.

20. Apparatus according to claim 18, wherein the motor of the control unit controls a normally open cam switch provided in an energization path of the search motor to cause the search motor to operate briefly after a selected recording has been reproduced and thereby to de-energize the selector relay corresponding to such recording.

21. Apparatus according to claim 18, including a memory unit having a switch operated after the selection of the deck and track to be reproduced and arranged so as to re-energise the deck selected and track selected relays in the event of a power failure to ensure that the apparatus subsequently continues to reproduce the selected recording when power is restored.

22. Apparatus according to claim 21, including a stop unit having a stop switch corresponding to each tape deck and adapted to be actuated by a stop foil provided on the corresponding tape to denote the end of the recordings thereon, each such stop switch being connected in a respective energization path of a memory solenoid of the memory unit, whereby at the end of the reproduction of the selected recording the solenoid is energized to energize the control unit motor.

23. Apparatus according to claim 1 including a coinoperated unit adapted to energize the selector unit on insertion of a coin to enable a user to select a recording or recordings for reproduction.

24. The apparatus of claim 1 wherein each of the magnetic tapes is in the form of an endless loop having a stop foil thereon.

* * * * *